United States Patent [19]

Micic et al.

[11] Patent Number: 4,625,153

[45] Date of Patent: Nov. 25, 1986

[54] SENSOR SYSTEM FOR TELEVISION PICTURE TUBES

[75] Inventors: Ljubomir Micic, Freiburg; Rolf D. Burth, Emmendingen; Thomas Fischer, Umkirch; Rainer Schweer, Mengen, all of Fed. Rep. of Germany

[73] Assignee: ITT Industries, Inc., New York, N.Y.

[21] Appl. No.: 637,509

[22] Filed: Aug. 3, 1984

[30] Foreign Application Priority Data

Aug. 5, 1983 [EP] European Pat. Off. ........ 83710052.8

[51] Int. Cl.⁴ ...................... H01J 29/56; H04N 17/02
[52] U.S. Cl. ...................................... 315/370; 358/10; 358/69
[58] Field of Search .................. 315/370, 368; 358/10, 358/67, 68, 69; 350/96.1

[56] References Cited

U.S. PATENT DOCUMENTS 3,939,486  2/1976  Tomii ..................................... 358/67
4,181,398  1/1980  Sick ...................................... 350/96.1

Primary Examiner—Theodore M. Blum
Assistant Examiner—David Cain
Attorney, Agent, or Firm—Donald J. Lenkszus

[57] ABSTRACT

A sensor system is adapted for use in automatically adjusting the deflection system of a television picture tube so as to compensate for pincushion distortion including a rectangular frame disposed along the edge of the screen within the sweep range of the electron beam. The frame comprises a striplike, regular arrangement of alternately transparent and opaque segments. In a first embodiment, a conductive path having an external terminal and shielded from the cathode of the television picture tube at regular intervals by equally large metal areas runs along the edge of the screen. This arrangement is on the inside of the screen. In a second embodiment, an optical-fiber array with at least one light-sensitive detector mounted at least one corner is used.

3 Claims, 5 Drawing Figures

SENSOR SYSTEM FOR TELEVISION PICTURE TUBES

BACKGROUND OF THE INVENTION

This invention relates to a sensor system for automatically aligning television-picture-tube deflection systems to achieve horizontal and vertical pincushion correction.

A sensor system of this kind is disclosed in Offenlegungsschrift DE 28 05 691 Al, which corresponds to U.S. Pat. No. 4,277,797. It coacts with an alignment computer, a pattern generator, a memory, and a digital deflection control unit to compensate for the geometric distortion due to the screen curvature in such a way that the reproduced image is free from those distortions. The system thus performs both horizontal (east-west) and vertical (north-south) pincushion correction. The sensor system in the prior art arrangement consists, for example, of a photodiode moved by a motor on a rail at a predetermined speed along, e.g., the left side of the picture from the top to the bottom, cf. page 32 of DE 28 05 691 Al. As an alternative, a strip fitted with 156 photodiodes may be used which need not be driven by a motor but is fixed, cf. page 32 of that Offenlegungsschrift. This known sensor system is quite costly and complicated since it requires either a motor drive or a large number of photodiodes.

SUMMARY OF THE INVENTION

Accordingly, an object of the invention is to provide a simpler sensor system for the automatic alignment of television-picture-tube deflection systems which neither is motor-driven nor requires a large number of photodiodes.

The principal advantage of the invention thus lies in the attainment of the object, namely in the fact that only few photodiodes and a specific array of optical fibers are necessary, or that the sensor system can be integrated into the television picture tube as an additional electrode arrangement, so to speak.

A sensor system is adapted for use in automatically adjusting the deflection system of a television picture tube so as to compensate for pincushion distortion including a rectangular frame disposed along the edge of the screen within the sweep range of the electron beam. The frame comprises a striplike, regular arrangement of alternately transparent and opaque segments. In a first embodiment, a conductive path having an external terminal and shielded from the cathode of the television picture tube at regular intervals by equally large metal areas runs along the edge of the screen. This arrangement is on the inside of the screen. In a second embodiment, an optical-fiber array with at least one light-sensitive detector mounted at at least one corner is used.

BRIEF DESCRIPTION

The invention will now be explained in more detail with reference to the accompanying drawings, in which:

FIG. 1 shows a first embodiment of the invention;
FIG. 2 shows a second embodiment of the invention;
FIG. 3 is a cross section taken along the dash-dotted line of FIG. 2;
FIG. 4 shows part of the arrangement according to the invention together with part of a test pattern; and
FIG. 5 shows the arrangement according to the invention together with part of another test pattern.

DETAILED DESCRIPTION OF THE DRAWINGS

Figure 1:
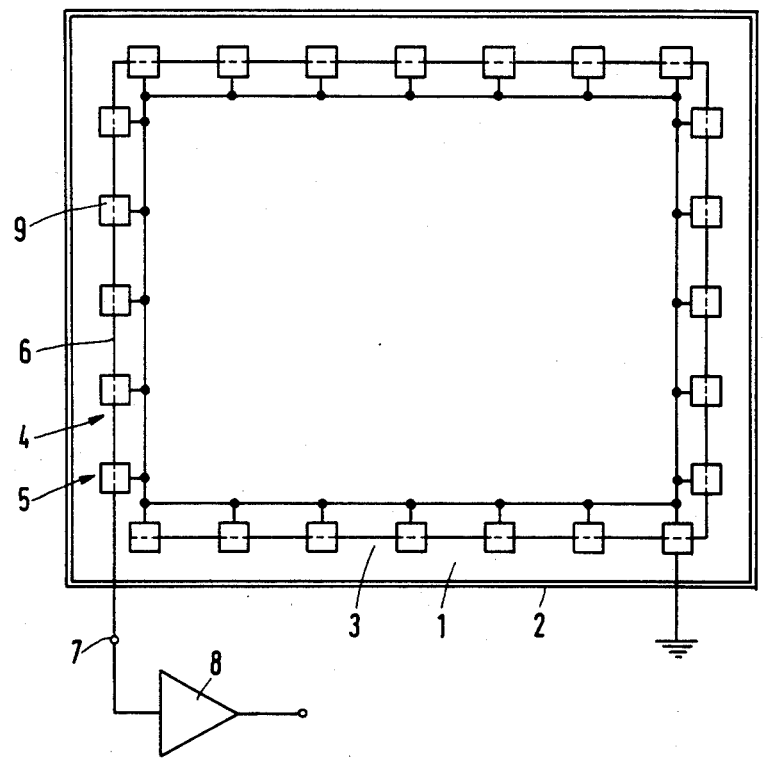

FIG. 1 shows a first embodiment of the invention in a schematic view from the cathode of the television picture tube 1 toward the inside of the screen 2. Along the edge of the screen, the rectangular frame 3 consisting of a striplike, regular arrangement of alternately transparent and opaque segments 4, 5 is arranged within the sweep range of the electron beam. In the embodiment of FIG. 1, the opaque segments 5 are equally spaced metal areas 9 of the same size. A conductive path 6 runs through the transparent segments 4 and below the metal areas 9 and is connected through the external terminal 7 to the input of the amplifier 8, which should have as high an input impedance as possible, so that its output provides an electric pulse whenever the electron beam strikes the conductive path 6. Since the metal areas 9 are electrically interconnected and grounded in operation, they shield the conductive path 6 from the cathode of the television picture tube 1.

To simplify the representation, the interconnecting lead between the individual metal areas 9 is shown in FIG. 1 within the frame 3, but this is not to be understood as a limitation; the interconnecting lead may also, of course, be provided on the other side of the metal areas 9 or even in the front portion of the tube neck but outside the accelerating electrode which is usually present there. The conductive path 6, the metal areas 9, and the interconnecting lead are, for example, suitably dimensioned metal layers deposited by evaporation, the conductive path 6 and the metal areas 9 having to be electrically isolated from each other by an insulating layer where they overlap one another.

Figure 2:
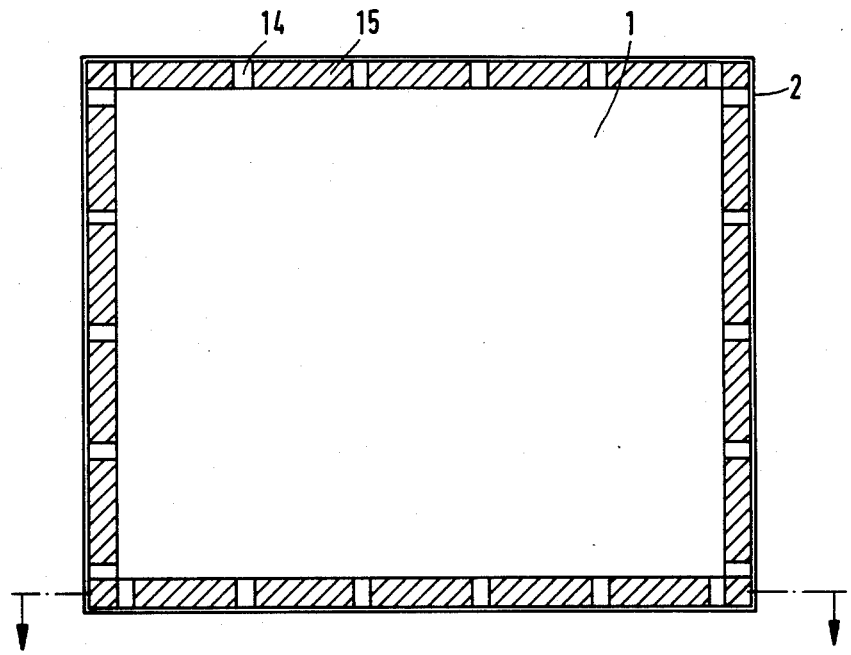
Figure 3:
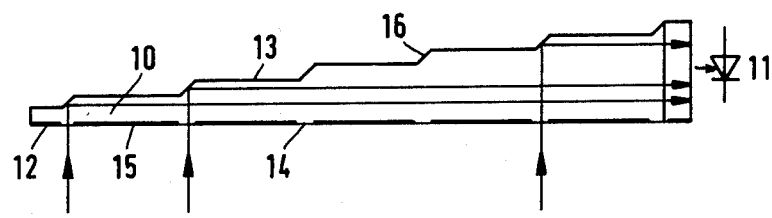

While the embodiment of FIG. 1 shows an arrangement which is provided within the television picture tube on the inside of the screen along the edge of the latter and, thus, must be formed during the manufacture of the television picture tube, the second embodiment of the invention, shown in FIGS. 2 and 3, shows an arrangement which can be attached to the outside of the screen of a conventional color-television tube later on. It is an array of optical fibers 10 with at least one associated light-sensitive detector 11. Details of the optical-fiber array 10 are apparent from FIG. 3, which is a cross section taken along the dash-dotted line of FIG. 2.

On the surface 12 which is in contact with the screen 2, the optical-fiber array 10 again has transparent and opaque segments, namely the transparent portions 14 and the opaque portions 15. The surface of the optical-fiber array 10 opposite the surface 12, i.e., the surface 13, has parallel portions above the opaque portions 15, while above the transparent portions 14, portions 16 are so inclined and, if necessary, provided with an internal reflective coating that the light coming from the screen and passing through the transparent portions 14 is directed to the light-sensitive detector 11.

In the schematic representation of FIG. 3, the portions 16 are inclined to the surface 12 at an angle of 45°, so that the light passing through the transparent portions 14 is deviated through 90° toward the right, where the light-sensitive detector 11 is located. However, other designs in which the portions 16 are inclined at an angle different from 45° are also possible. For example, the portions 16 may be so inclined that the light reflected by them falls on the opaque portions 15, which are then provided with an internal reflective coating, and from there on the likewise internally reflecting portions 13, thus propagating to the light-sensitive detector 11.

Figure 4:
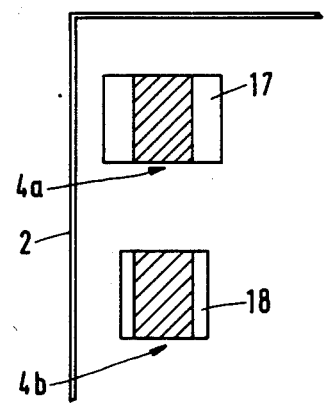

As was mentioned hereinabove, the sensor system according to the invention is used together with a pattern generator in the automatic alignment of television-picture-tube deflection systems to achieve horizontal and vertical pincushion correction. FIG. 4 shows highly schematically what form such a pattern may have. It shows an enlarged part of the corner at the upper left of the screen of FIG. 1 with two transparent segments 4a, 4b (hatched), which are not drawn to scale. The segment 4a is centrically covered by a test spot 17 which is twice as wide as the segment 4a, while the segment 4b is centrically covered by a narrower test spot 18. The test spots 17, 18 of different width are to illustrate that the pattern generator first generates wide, bright test spots corresponding to the test spot 17 for all vertical segments 4 and then reduces this width step by step to that of the segments 4. If, at the beginning of the automatic alignment, calibration is performed by means of test spots equal in area to the transparent segments 4, in which case the test spots are dark and the resulting output signals of the sensor system are stored as minimum values, the step-by-step reduction of the area of bright test spots then permits the distortion caused by the nonspherical screen to be compensated for by determining the maximum values at the output of the sensor system and correspondingly influencing the deflection system via the alignment computer.

Figure 5:
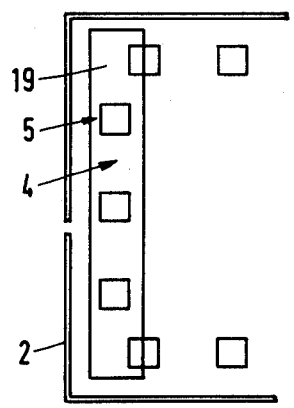

While the test spots 17, 18 of FIG. 4, covering only the transparent segments 4, allow the image to be centered on the screen from the edge of the screen, the vertical test stripe 19 of FIG. 5 makes it possible to perform horizontal pincushion correction. During calibration, the test stripe 19 is first generated as a bright stripe, and the signals appearing at the sensor output are stored. Likewise, the data obtained with a dark test stripe 19 is stored. The maximum value is then determined by reducing the area of the bright test stripe 19 step by step. It serves as a measure for correct alignment. This alignment must be performed for each of the two sides of the television picture tube separately.

Since present-day television receivers, particularly those with digital signal-processing circuitry, contain microprocessors, the automatic alignment can also be performed by a suitably programmed microprocessor. The alignment cycle can then follow every turn-on of the television receiver, but it can also take place after every channel selection.

What is claimed is:

1. A sensor system for automatically aligning the deflection system of a television picture tube to achieve horizontal and vertical pincushion correction, comprising:
    a rectangular frame disposed at the edge of the tube screen in the sweep range of the electron beam, said frame being a stripelike, regular arrangement of alternately transparent and opaque segments, said transparent and opaque segments disposed within the television picture tube;
    said opaque segments being metal areas; and
    said sensor system including a conductive path having an external terminal for connection to an amplifier having a high input impedance said conductive path running along the edge of said screen, and said conductive path being shielded from the cathode of said television picture tube at regular intervals by said metal areas, said metal areas being electrically interconnected, and said metal areas being grounded during an aligning operation.

2. A sensor system in accordance with claim 1 wherein:
    said inclined portions each have an internal reflective coating such the light passing through said transparent portions is directed to said light-sensitive detector.

3. A sensor system for automatically aligning the deflection system of a television picture tube to achieve horizontal and vertical pincushion correction, comprising:
    a rectangular frame disposed at the edge of the tube screen in the sweep range of the electron beam, said frame being a stripelike, regular arrangement of alternately transparent and opaque segments;
    said frame includes an optical-fiber array attached to the outside of said television picture tube;
    at least one light-sensitive detector mounted at at least one corner of said optical-fiber array; and
    said optical-fiber array having alternately transparent and opaque portions at one surface thereof resting against said screen, and the surface of said optical-fiber array opposite said one surface resting against said screen has parallel portions above said opaque portions, and inclined portions above said transparent portions, said optical-fiber array transparent and opaque portions respectively forming said frame transparent and opaque segments.

* * * * *